United States Patent Office 2,860,946
Patented Nov. 18, 1958

2,860,946
CYANOETHYLATION PROCESS

Salem F. Belt, Texas City, Tex., assignor to Monsanto Chemical Company, St. Louis, Mo., a corporation of Delaware No Drawing. Application August 15, 1955
Serial No. 528,543

14 Claims. (Cl. 8—120)

This invention relates to the preparation of cyanoethyl ethers of cellulose and, more particularly, to an improved process for the cyanoethylation of cellulose by the reaction of acrylonitrile with cellulose.

It is well known that cellulose may be cyanoethylated by reacting it with acrylonitrile in the presence of an alkaline catalyst. Processes for making cellulose derivatives having many desirable and advantageous properties by means of this reaction are the subject of a number of U. S. patents, typical among which may be mentioned U. S. Patents 2,332,049 and 2,375,847. In these and other processes of the prior art, reaction is usually effected by impregnating the cellulose with an aqueous solution of a strongly alkaline hydroxide, removing excess solution from the impregnated cellulose, and immersing or soaking the thus impregnated cellulose in acrylonitrile itself, or in a solution of acrylonitrile in an inert water-immiscible organic solvent, for a time sufficient to react acrylonitrile with the cellulose, and removing acrylonitrile and any of the alkaline catalyst remaining in the treated cellulose by acid- or water-washing. Cyanoethylation may also be effected on a continuous basis by passing the cellulose, after it has been impregnated with alkali, through acrylonitrile and then passing the thus treated cellulose into a closed chamber maintained at a temperature from about 50 to about 80° C. for a predetermined length of time, depending upon the degree of substitution desired, and then washing and drying the treated cellulose. Alternatively, the impregnation with liquid acrylonitrile may be omitted and the alkali-treated cellulose may be passed directly into a chamber maintained at a temperature of about 70 to 80° C. and containing acrylonitrile vapors for a sufficient length of time to permit the cyanoethylation reaction to occur. In all of these processes, there are many variables to be considered in determining optimum conditions for the production of a derivative with the desired specific properties.

One of the more important of these variables is the amount of water in the reaction mixture. While the presence of a certain amount is required for successful reaction, any excess leads to the loss of acrylonitrile values. Under the usual conditions of reaction, water present is cyanoethylated along with the cellulose by the acrylonitrile to $\beta,\beta'$-oxydipropionitrile by-product, thus reducing the yield of the desired cyanoethylated cellulose based on acrylonitrile. The optimum quantity of water, therefore, will vary depending upon the precise balance desired between the reaction rate and the amount of by-product made. Generally, at low water content, the cyanoethylation reaction is characterized by slower rates and proportionately longer reaction times. However, the lower rates resulting from the use of lesser amounts of water are considered practical when operation at lower water levels results in a decreased production of the by-product $\beta,\beta'$-oxydipropionitrile. The methods for controlling water content of the cellulose in the prior art have been restricted to the alkali-treating step prior to cyanoethylation, wherein the usual procedure consists of steeping the cellulose in an excess of an aqueous solution of an alkaline material such as sodium hydroxide and thereafter eliminating the excess by mechanical means such as centrifugation, squeezing or pressing, by extraction of the excess water with acrylonitrile or some other extractant, or by simple thermal drying. It has now been discovered that in processes wherein acrylonitrile vapors are employed for cyanoethylation, by-product make may be drastically reduced if water is removed from the cellulose by azeotropic distillation with acrylonitrile as the azeotroping agent during the course of the cyanoethylation reaction proper.

It is an object of the invention, therefore, to provide an improved process for the cyanoethylation of cellulose.

It is a further object of this invention to provide a process for the cyanoethylation of cellulose by the reaction of cellulose with acrylonitrile in the presence of an aqueous alkaline catalyst in which the production of by-product $\beta,\beta'$-oxydipropionitrile is minimized.

It is a still further object of the invention to provide an improved continuous process for the cyanoethylation of cellulosics, particularly cellulosic fabrics, by the reaction of said cellulosics with acrylonitrile in the presence of an aqueous alkaline hydroxide wherein maximum yield based on acrylonitrile is achieved.

Other objects and advantages of the invention will become apparent from the following description thereof.

According to the invention, the cellulose or cellulosic material is impregnated with an aqueous solution of a strongly alkaline hydroxide. The impregnated material is then continuously passed into a chamber or suitable apparatus maintained at a temperature from about 70° to about 80° C. containing acrylonitrile vapors wherein the cellulose is cyanoethylated by said vapors as they condense thereon while an acrylonitrile-water azeotrope is continuously withdrawn from said chamber or apparatus. The cyanoethylated material is then washed and dried. The process is illustrated by the following examples but these are not to be so construed as to limit it in any manner except as it is limited in the appended claims.

Example I

The apparatus employed was of relatively simple construction. It comprised a long rectangular tank divided into several chambers or compartments. The tank was provided with a fabric feed roll at one end, a motor-driven fabric take-up roll at the other end, and a series of guide rolls located within each of the chambers so that the cellulosic fabric travelled continuously and successively into and out of each of the chambers. Each chamber was equipped with coils in the bottom in order that the contents of the chamber might be heated or cooled, as the case might be, either by circulating steam or cooling water through the coils in order to maintain the desired temperature in the various chambers.

In the first chamber, a 6.02% aqueous solution of sodium hydroxide was "padded on" to the 4-ounce cotton cloth, 8½ inches wide and 100 yards long. This was done by passing the cloth over the guide rollers and squeeze rolls provided in the chamber so that it was led down into the chamber, through the aqueous solution of the sodium hydroxide, and then through the squeeze rolls where the excess sodium hydroxide solution was squeezed from the caustic-treated material. The impregnated cotton cloth then had a caustic solution uptake equal to approximately 53% of the weight of the dry cloth.

The caustic-treated cloth was then led continuously into and through a second chamber filled with vapors of acrylonitrile. Acrylonitrile was fed continuously to this chamber where it was vaporized by maintaining the temperature therein in the range from about 70 to about 80° C. Guide rollers were also provided here so that the cloth travelled up and down within the chamber to insure the necessary contact between the fabric and the vapors of acrylonitrile. As the cloth entered the chamber, the vapors of acrylonitrile condensed on it and reacted with the cellulose. The approximate reaction time in which a given area of cloth remained in the reaction chamber was about 3.5 minutes. The chamber was provided with water-cooled condensers equipped with take-off lines so that the acrylonitrile-water azeotrope mixture which was formed from the water present in the cloth and acrylonitrile in the chamber (boiling point approximately 71° C.) was continuously removed from the reaction chamber. A total of 43 pounds of acrylonitrile-water mixture, representing 2.2 pounds of water, was collected in a receiving vessel during the total reaction period of about 97 minutes.

As the treated fabric emerged from the reaction chamber, it was guided into the next, or neutralizing chamber where it was washed with a mixture of acrylonitrile and acetic acid and thence passed into the last chamber where it was washed with water until neutral and free of any acrylonitrile. Washing was effected by merely passing the cloth by means of guide rollers up and down through the body of the washing medium. After emerging from the washing chamber, the cloth was wound on the motor-driven roll and dried by air drying.

Samples of the treated cloth were taken at various points along its length and analyzed for nitrogen content. Average nitrogen content was found to be approximately 3.1%.

At the conclusion of the run, liquid which had condensed in the reaction chamber was collected and weighed. The liquid in the neutralizing tank was likewise drained and weighed. Samples of these liquids were analyzed for $\beta,\beta'$-oxydipropionitrile content. In addition, spot samples of the cyanoethylated cloth taken as the cloth emerged from the neutralizing tank were thoroughly washed with distilled water and the washings were also analyzed for $\beta,\beta'$-oxydipropionitrile. From the analytical results obtained, the actual quantity of by-product produced was determined. From this figure, in turn, the amount of acrylonitrile required to produce this amount of by-product was calculated and this amount was related to the amount employed in cyanoethylation of the cellulose determined by means of the nitrogen content of the cellulose. The ratio of acrylonitrile which went to residue to acrylonitrile employed in cyanoethylating the cloth in this run was thus established to be 0.83.

*Example II*

Using the same apparatus and the same type of cotton fabric employed in Example I, 100 yards of the material was padded through a 6.14% aqueous solution of sodium hydroxide. After removal of the excess caustic solution by means of the squeeze rolls, the impregnated cotton cloth had a caustic solution uptake of approximately 49% of the weight of the dry cloth.

As in Example I, the caustic-treated cloth was then led continuously through the reaction chamber filled with acrylonitrile vapors. In this run, however, no acrylonitrile-water azeotrope was removed. The take-off lines from the condensers were blinded and they were used as reflux condensers to eliminate vapor leaks and to relieve any build-up of back pressure in the system. The duration of the run was comparatively the same, in this case 100 minutes, and the approximate reaction time for a specific area of cloth was 3.6 minutes.

The cyanoethylated material was then washed and dried in the manner described in Example I.

Analysis of samples of the treated cloth taken at various points along its length indicated that its average nitrogen content was about 2.5%. Formation of by-product throughout the system was determined in the same manner as outlined in Example I. The ratio of acrylonitrile which went to residue or by-product formation to acrylonitrile actually employed in cyanoethylation of the cloth in this case was 2.49.

It may be seen from the examples that the technique of the invention for removing water during the cyanoethylation reaction results in substantial reduction in the loss of acrylonitrile due to its reaction with water.

Many variations in procedure from that given in the examples may be made without departing from the scope of the invention. This cyanoethylation technique can be used on any of the various forms of cellulose. Cellulose obtained from wood pulp by the removal of lignin and resins, natural cellulose fibers such as jute, ramie, linen, etc., regenerated cellulose such as viscose, or even partially substituted derivatives of cellulose such as methyl cellulose or ethyl cellulose can all be employed. While the continuous process described herein is particuarly suited for the cyanoethylation of cotton cloth or fabrics, it is not limited thereto. This continuous process can be used to cyanoethylate multiple yarns and non-woven cellulosic fabrics. Other forms of cellulose may also be continuously cyanoethylated by this process by affixing the cellulosic material to screens or like carriers which are then passed through the continuous unit. Thus webs, felts, batting or other forms of cellulose may also be treated by the process of this invention.

In addition to sodium hydroxide, the other alkali metal hydroxides such as potassium hydroxide and lithium hydroxide may also be used as the alkaline agents which serve to catalyze the addition of acrylonitrile. Other suitable alkaline agents include strongly basic quaternary ammonium hydroxides such as benzyl trimethyl ammonium hydroxide, dibenzyl dimethyl ammonium hydroxide and the like. The concentration of the alkaline agent may vary in strength from as little as 0.5% to as much as 20%. To some extent, reaction rates are dependent upon caustic concentrations, with lower concentrations resulting in lower reaction rates. However, at high caustic concentrations, chances for hydrolysis of both the acrylonitrile and the cyanoethylated product are increased. Optimum concentrations appear, therefore, to lie in the range from about 0.5% to about 10%

The preferred method for impregnating cellulose with the alkaline catalyst comprises immersion of the cellulosic material in an excess of the aqueous solution since this gives a more uniform distribution of catalyst throughout the cellulose. After impregnation, excess solution may be removed by squeezing, centrifuging, extraction with acrylonitrile or some other extractant, or other equivalent operation. Generally, in most commercially practical operations employing any of these techniques, the amount of aqueous caustic still left in the cellulosic material after such treatment is from about 40 to about 70% of the dry weight of the cellulose. It is for this reason that the technique or process of the invention is most advantageous. With this level of water content, by-product make is high, but when the process of the invention is employed the water is effectively removed from the scene of the reaction after it has served its purpose in activating the reaction, thus drastically reducing the by-product, i. e., $\beta,\beta'$-oxydipropionitrile, formed. This method too provides for attainment of the advantages of low water content in the reaction without the detrimental effect on the fiber structure which may occur when the impregnated cellulose is dried by thermal treatment, for example, to a sufficiently low water level to affect any sizeable reduction in by-product.

In the continuous vapor-phase operation, a large excess of acrylonitrile over that required for the cyanoethylation reaction with the cellulose is always maintained in the reaction chamber and the temperature is kept at 70–80° C. The process of the invention is not limited to a strictly vapor-phase operation, however. It is applicable as well in a process wherein only part of the operation is in the vapor phase as in the case, for example, where alkali treated cellulose is impregnated with liquid acrylonitrile and thereafter maintained in a reaction chamber heated to a temperature from about 50° C. to about 80° C., the water-acrylonitrile azeotrope being removed from the latter reaction chamber. In this case, the amount of acrylonitrile employed may be varied to some extent depending upon the degree of cyanoethylation desired in the final product. A quantity of acrylonitrile sufficient to provide an uptake by the caustic-treated cellulose of from about 10% to about 200% of acrylonitrile based on the dry weight of the cellulose is generally satisfactory. Reaction temperatures in both phases of this continuous process are maintained in the range from about 50° C. to about 80° C. Temperatures for the liquid acrylonitrile below 50° C. may be employed but they are impractical because they result in such lengthened reaction times.

The time of reaction necessary depends upon the degree of cyanoethylation desired and upon other factors such as the concentration of catalyst employed, the proportions of acrylonitrile and water used, the temperature of the reaction, and the like. In the usual so-called vapor-phase process using cotton cloth, for example, the total time for continuous treatment with acrylonitrile vapor usually varies from about one to about thirty minutes. A contact time from about 2 to about 15 minutes is preferred when the final product, for example, is to contain from 3-4% nitrogen. In the alternative two-step process, when the cellulose is dipped into liquid acrylonitrile, the time required in this impregnating step may vary from about one to about twelve minutes with the subsequent residence time in the heated chamber consequently varying from about two to about eighteen minutes.

When liquid acrylonitrile is employed, the acrylonitrile may be contained in a solvent or diluent, if desired. Organic liquids such as benzene, toluene, aliphatic hydrocarbons, dioxane or certain halogenated hydrocarbons and the like may be used. The amount of diluent may be varied from an amount equal to or less than the amount of acrylonitrile to an amount several times that of the acrylonitrile. However, the quantity of diluent employed in no case affects the amount of other reactants used and the latter should still be maintained within the limits indicated above for successful operation.

The invention is not to be considered as limited to the particular type of apparatus set forth in the examples either. Many other varieties of equipment suitable for conducting the reaction can be contemplated. A very effective system, for example, would be one wherein the alkali-impregnated fabric would be passed along a labyrinthine path by means of guide rollers through a heated chamber with acrylonitrile vapors being fed countercurrent to the moving fabric and the acrylonitrile-water azeotrope being collected at a point opposite the acrylonitrile feed point.

What is claimed is:

1. A continuous process for cyanoethylating cellulose which comprises the steps of continuously impregnating the cellulose with an aqueous solution of a strongly alkaline hydroxide, continuously subjecting said alkali-impregnated cellulose to contact with vapors of acrylonitrile in a suitable apparatus maintained at a temperature from about 70 to about 80° C. while continuously withdrawing and removing from said apparatus an azeotropic mixture formed from the acrylonitrile therein and the water present in said cellulose, and thereafter washing and drying the cyanoethylated cellulose.

2. A continuous process for cyanoethylating cellulose which comprises the steps of continuously impregnating the cellulose with an aqueous solution of a strongly alkaline hydroxide of a concentration within the range from about 0.5% to about 20%, continuously subjecting said alkali-impregnated cellulose to contact with vapors of acrylonitrile in a suitable apparatus maintained at a temperature from about 70 to about 80° C. while continuously withdrawing and removing from said apparatus an azeotropic mixture formed from the acrylonitrile therein and the water present in said cellulose, and thereafter washing and drawing the cyanoethylated cellulose.

3. A continuous process for cyanoethylating cellulose which comprises the steps of continuously impregnating the cellulose with from about 40% to about 70% of its weight of an aqueous solution of a strongly alkaline hydroxide of a concentration within the range from about 0.5% to about 20%, continuously subjecting said alkali-impregnated cellulose to contact with vapors of acrylonitrile in a suitable apparatus maintained at a temperature from about 70 to about 80° C. while continuously withdrawing and removing from said apparatus an azeotropic mixture formed from the acrylonitrile therein and the water present in said cellulose, and thereafter washing and drying the cyanoethylated cellulose.

4. The process of claim 2 wherein the alkaline hydroxide is sodium hydroxide.

5. The process of claim 3 wherein the alkaline hydroxide is sodium hydroxide.

6. The process of claim 4 wherein the cellulose is a cellulosic fabric.

7. The process of claim 5 wherein the cellulose is a cellulosic fabric.

8. A continuous process for cyanoethylating cellulose which comprises the steps of continuously impregnating the cellulose with an aqueous solution of a strongly alkaline hydroxide, continuously passing the thus impregnated cellulose through acrylonitrile, then continuously passing said treated cellulose through a suitable apparatus maintained at a temperature from about 70 to about 80° C. while continuously withdrawing and removing from said apparatus an azeotropic mixture formed from the acrylonitrile vaporized therein and the water present in said cellulose, and thereafter washing and drying the cyanoethylated cellulose.

9. A continuous process for cyanoethylating cellulose which comprises the steps of continuously impregnating the cellulose with an aqueous solution of a strongly alkaline hydroxide of a concentration within the range from about 0.5% to about 20%, continuously passing the thus impregnated cellulose through acrylonitrile, then continuously passing said treated cellulose through a suitable apparatus maintained at a temperature from about 70 to about 80° C. while continuously withdrawing and removing from said apparatus an azeotropic mixture formed from the acrylonitrile vaporized therein and the water present in said cellulose, and thereafter washing and drying the cyanoethylated cellulose.

10. A continuous process for cyanoethylating cellulose which comprises the steps of continuously impregnating the cellulose with from about 40% to about 70% of its weight of an aqueous solution of a strongly alkaline hydroxide of a conentration within the range from about 0.5% to about 20%, continuously passing the thus impregnated cellulose through acrylonitrile, then continuously passing said treated cellulose through a suitable apparatus maintained at a temperature from about 70 to about 80° C. while continuously withdrawing and removing from said apparatus an azeotropic mixture formed from the acrylonitrile vaporized therein and the water present in said cellulose, and thereafter washing and drying the cyanoethylated cellulose.

11. The process of claim 9 wherein the alkaline hydroxide is sodium hydroxide.

12. The process of claim 10 in which the alkaline hydroxide is sodium hydroxide.

13. The process of claim 11 in which the cellulose is a cellulosic fabric.

14. The process of claim 12 in which the cellulose is a cellulosic fabric.

References Cited in the file of this patent
UNITED STATES PATENTS

| | | |
|---|---|---|
| 1,920,702 | Lautenberg | Aug. 1, 1933 |
| 2,051,492 | Lorand | Aug. 18, 1936 |
| 2,332,049 | Bock et al. | Oct. 19, 1943 |
| 2,375,847 | Houtz | May 15, 1945 |
| 2,786,735 | Compton et al. | Mar. 26, 1957 |

OTHER REFERENCES

Textile Industries, October 1953, pp. 138A to 138D and 188.

The Textile Research Journal, January 1955, pp. 58 and 65 to 75.

The Textile Research Journal, March 1955, pp. 246 to 253.